April 21, 1931.  V. DOBRICK  1,801,805
APPARATUS FOR THE PRODUCTION OF WIRE GRATINGS BY ELECTRIC WELDING
Filed Nov. 27, 1926  3 Sheets-Sheet 1
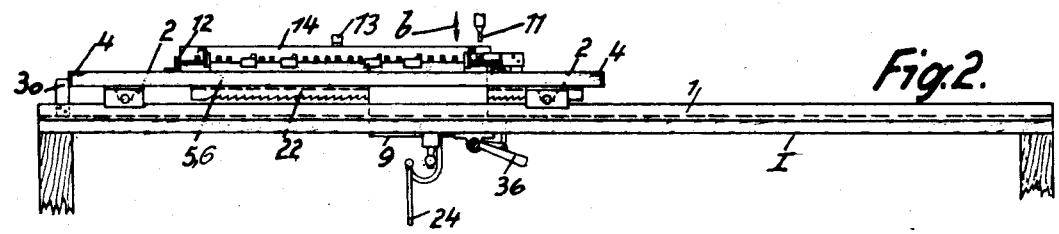
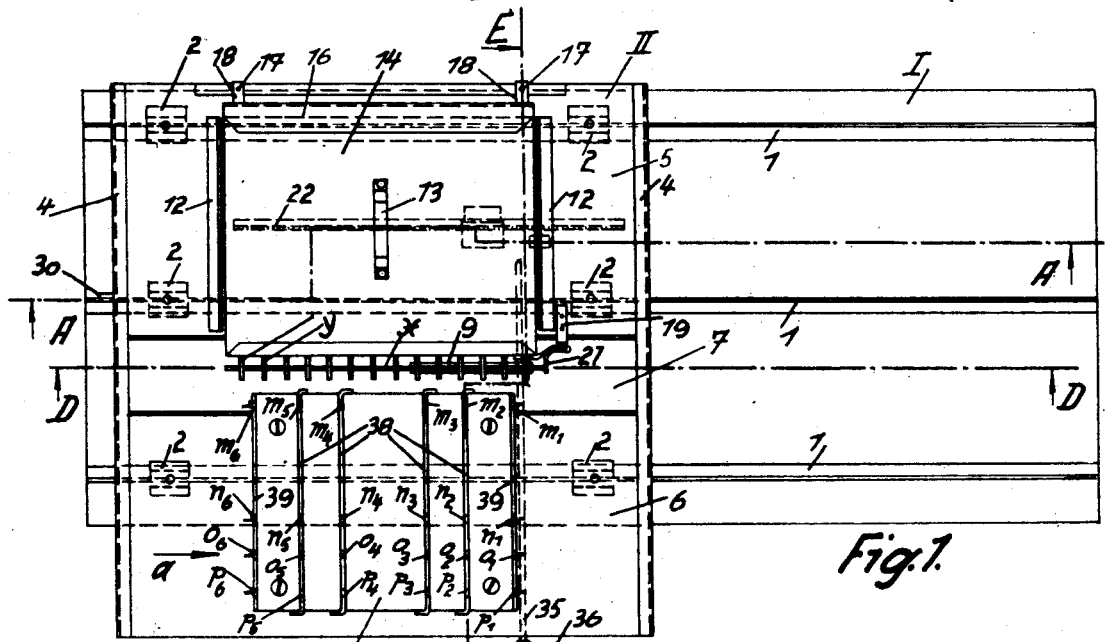
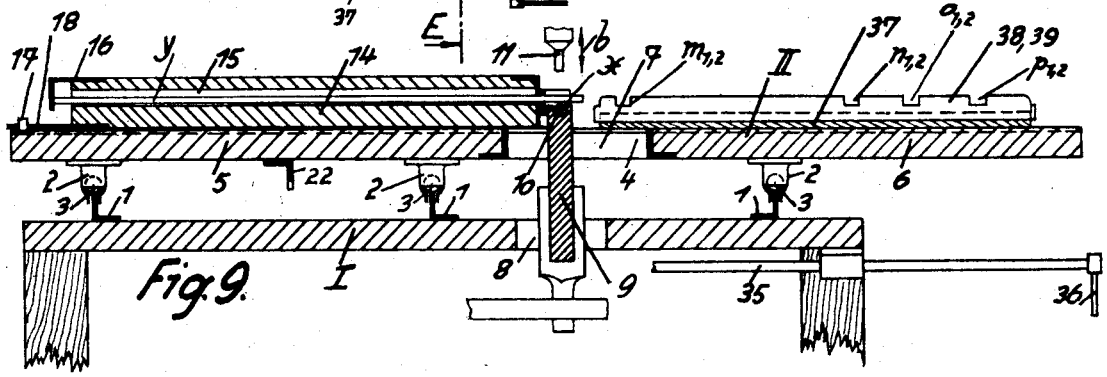
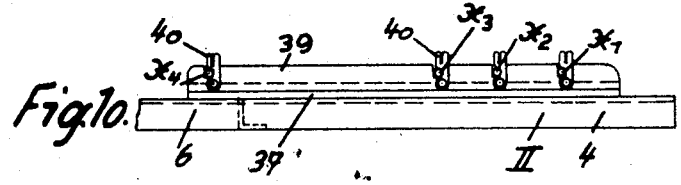

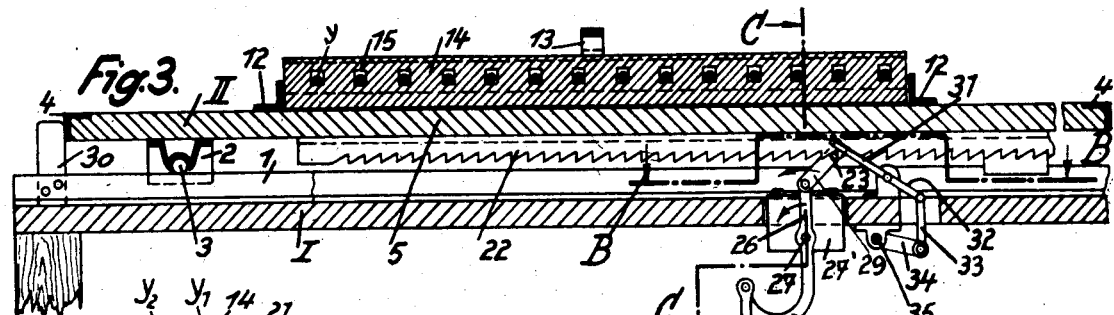
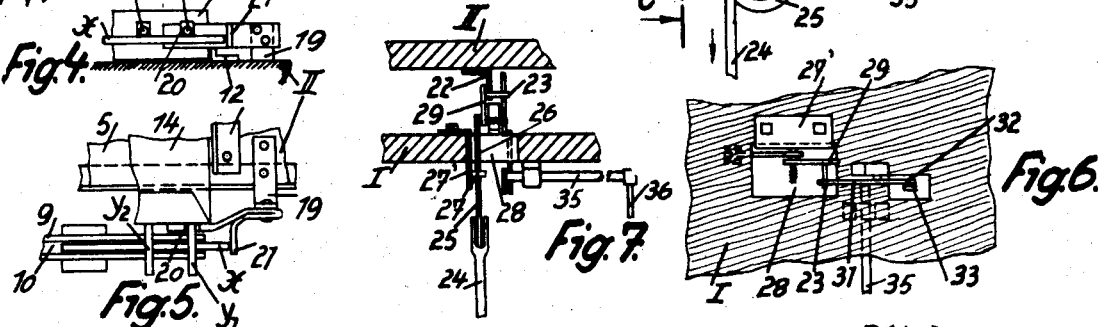
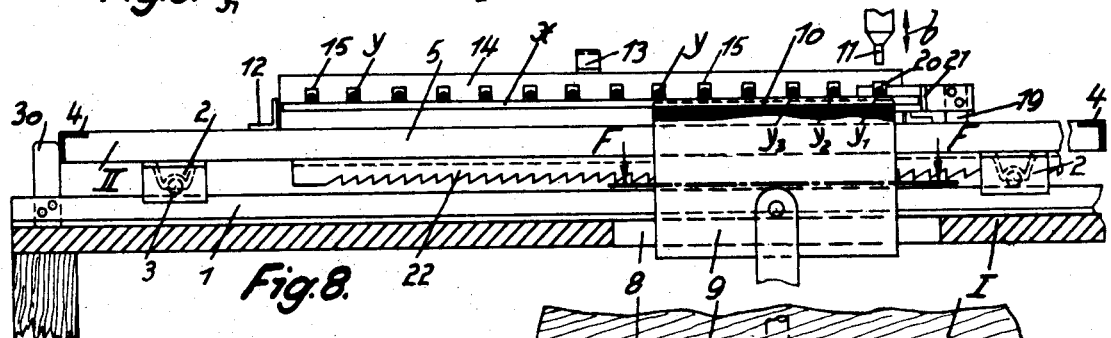
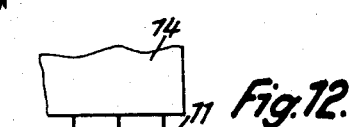
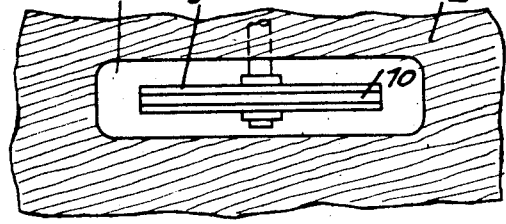
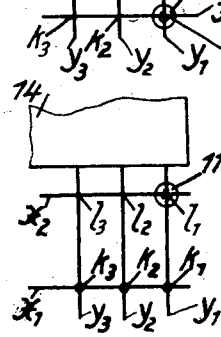
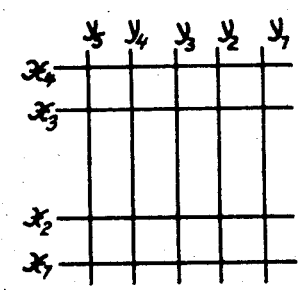

Patented Apr. 21, 1931

1,801,805

UNITED STATES PATENT OFFICE

VICTOR DOBRICK, OF BRESLAU, GERMANY

APPARATUS FOR THE PRODUCTION OF WIRE GRATINGS BY ELECTRIC WELDING

Application filed November 27, 1926, Serial No. 151,211, and in Germany December 24, 1925.

Wire gratings for bird's cages were up to the present made by tying the wires at the points of intersection with thin wire and sometimes by soldering the wire intersections at the ends. This work is, however, difficult and could not be carefully carried out when great quantities were to be manufactured, so that the wires were not accurately parallel with one another in the one direction as well in the other direction, the grating being consequently not of the best appearance.

This invention has for its object, to avoid these inconveniences by creating an apparatus for electrically welding all the wire-intersections in a wire grating. The apparatus according to the invention comprises a carriage which serves as carrier for one of the two sets of wires and is movable in the direction in which the wires of the other set extend so that it stepwise conducts the wires together with one of the wires to be welded-on and which intersects at right angles the wires on the carriage between welding poles, whereupon the carriage is moved back, the same proceeding being repeated after the wires on the carriage have been advanced on the carriage in transverse direction a distance equal to the distance between two consecutive intersecting wires to be welded on.

Further details of the invention will be hereinafter described.

A form of construction of the improved apparatus is shown, by way of example, in the accompanying drawings in which:—

Fig. 1 shows the apparatus separate from the welding machine in plan view and

Fig. 2 is a front elevation of the apparatus on smaller scale than the other figures.

Fig. 3 is a longitudinal section on line A—A of Fig. 1.

Fig. 4 is a front elevation of a detail of the apparatus.

Fig. 5 is a top plan view of Fig. 4.

Fig. 6 is a section on B—B of Fig. 3.

Fig. 7 is a section on line C—C of Fig. 3.

Figs. 8 and 9 are sections on lines D—D E—E respectively of Fig. 1.

Fig. 10 shows the right end of the carriage viewed in the direction of the arrow $a$ in Fig. 1.

Fig. 11 is a section on line F—F of Fig. 8.

Figs. 12 and 13 illustrate diagrammatically the operation.

Fig. 14 shows in top plan view the wire grating to be produced.

Fig. 15 shows in side elevation the welding machine fitted with the apparatus for producing wire gratings.

Fig. 16 is an end elevation of Fig. 15.

Figure 75:
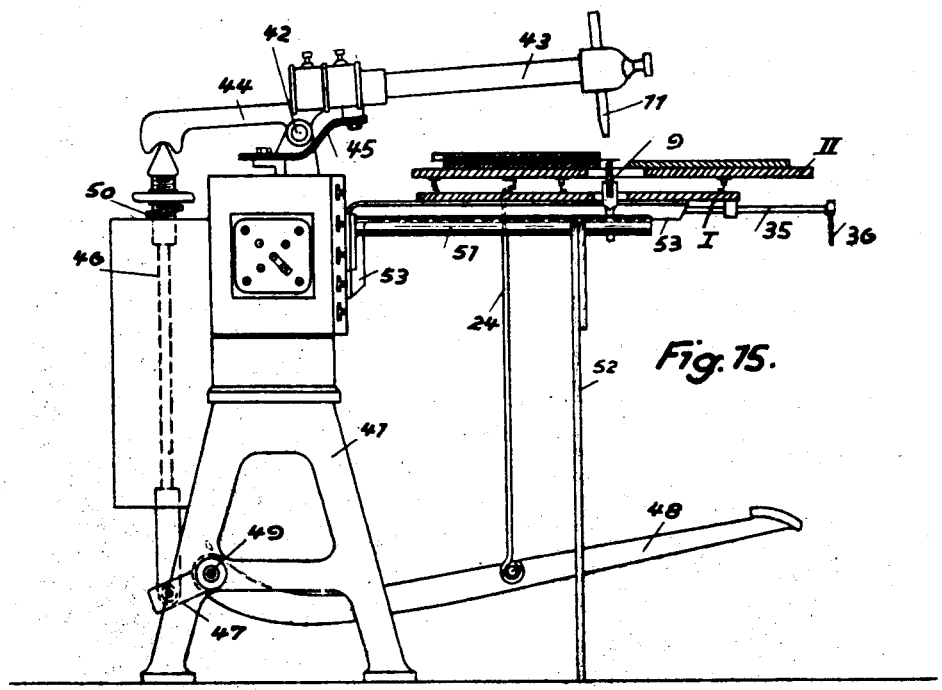
Figure 76:
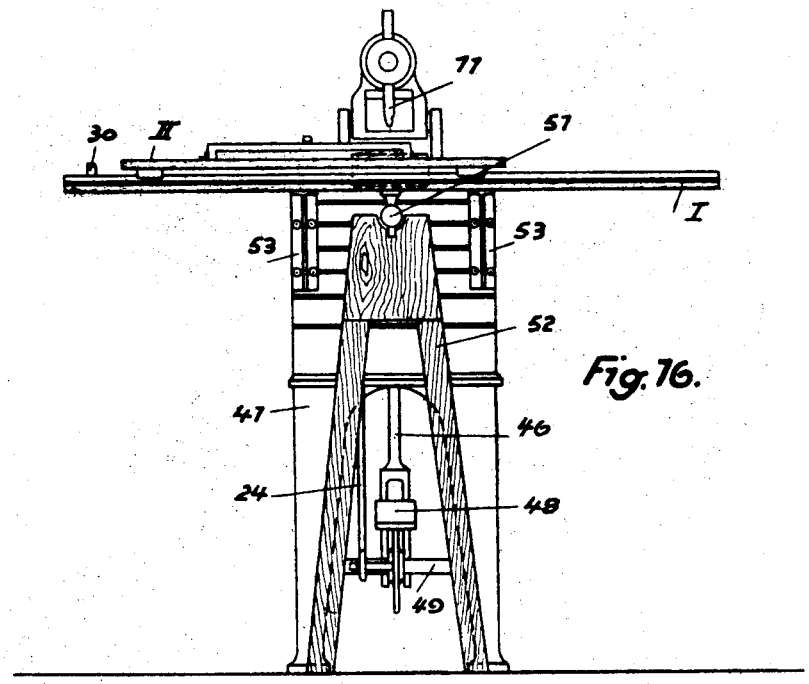

As shown in Figs. 15 and 16 the apparatus is mounted on a welding machine of ordinary construction. The base 41 of the welding machine, adapted to be connected up with the local current supply, carries the different parts of the apparatus, the transformer, starting switch, resistance etc. A two-armed lever 43, 44 is mounted on a rotatable axle 42 on the base 41. One arm 43 of this lever carries the upper welding pole 11 connected with the current supply. A spring 45 tends to hold the lever 43, 44 in the position shown in the drawing. The other arm 44 of this lever is opposite the head of a vertically reciprocating rod 46, the lower end of which is connected with the arm 47 of another two-armed lever 47, 48 rotatably mounted in the base of the welding machine, the other arm 48 of this lever forming a pedal. A spring 50 acts on the rod 46 and tends to hold it together with the pedal 48 in the position shown in the drawing. The rod shaped holder of the lower welding pole supported at its front end by a board 52 and also connected with the electric circuit is fastened on the base of the welding machine. This pole is immovable as hereinafter described. The base of the welding machine also carries the table plate I supported by the stays of the device for producing wire grating which constitutes the subject matter of the invention and is hereinafter fully described. It should be further mentioned that for the sake of clearness a larger number of details are omitted from Figs. 15 and 16 but clearly shown in the remaining figures of the drawings.

The apparatus consists essentially of the table plate I already mentioned carried by legs and of a carriage II movable on said table in the longitudinal direction. The table plate has on its upper surface longitudinal rails $l$ of angle iron, the carriage II having on the lower surface balls 3 located in bearings 2 (see specially Figs. 3, 8 and 9) which slide on the upwardly directed arm of the angle iron rails 1.

The carriage II consists of two plates 5, 6 (Figs. 1, 9) which are held together by means of two transverse continuous side bars 4 (Figs. 1, 2 and 3) which are spaced in the transverse direction a certain distance, so that a gap 7 extending in longitudinal direction is formed between the same. Through this gap 7 and through a slot 8 (Figs. 8, 9 and 11) in the table I under the gap 7 projects the lower welding pole above the top surface of the carriage. This welding pole is formed by a plate 9 placed on edge in the longitudinal direction of the carriage (Figs. 1, 8, 9, 11), said plate 9 having in its upper edge a groove 10 (Figs. 8, 9, 11) designed to receive a longitudinal wire $x$. As already mentioned the welding pole 9 is stationary, whilst the upper welding pole 11 above the same (Figs. 2, 8 and 9) is adapted to be moved in vertical direction (direction of the arrow $b$ of Figs. 2, 8, 9). As the gap 7 extends in longitudinal direction between the two plates 5 and 6 of the carriage, the lower welding pole 9 does not impede the shifting of the carriage to the right and left on the rails 1 of the table plate I.

Between two upper transverse rails 12 (Figs. 1, 2, 3 and 8) the rear plate 5 of the carriage carries a removable mould plate 14 (Figs. 1, 2, 3, 4, 8 and 9) having a handle 13 (Figs. 1, 2, 3 and 8) said mould plate having further apertures 15 (Figs. 3, 8, 9) for the insertion of the transverse wires $y$ (Figs. 1, 3, 8 and 9) for the grating to be produced, said transverse wires being all cut to the same length and having play in vertical direction in said apertures. A longitudinal rail 16 (Figs. 1 and 9) consisting of an angle iron fixed to the rear longitudinal edge of the mould plate 14 forms by its downwardly directed arm an abutment for the transverse wires $y$ to be inserted into the apertures 15, so that the wires of equal length project uniformly at the front end from the mould plate. Transverse wires $y$ are supplied to the mould plate 14 prior to the insertion of the same between the rails 12 of the carriage II. In order to bring said mould plate at the insertion between the rails 12 accurately into the desired position, the carriage plate has at its rear long edge two studs 17 (Figs. 1 and 9) and the mould plate 14 has rearwardly projecting flat irons 18 which have corresponding holes which are designed to receive the studs 17. A bar 19 (Figs. 1, 4, 5 and 8) at the front edge of the carriage plate 5 and projecting from the same in forward direction carries a guide 20 (Figs. 5 and 8) for the extreme right hand transverse wire $y$ (Fig. 4) and further a stop 21 which serves to bring the longitudinal wire $x$ placed into the groove 10 of the welding plate 9 accurately into the desired position with regard to the transverse wires $y$ (Fig. 5).

When the working begins the carriage II is on the table plate I in such a position that the first transverse wire $y_1$ (Figs. 4, 5 and 12) engaging with the guide 20 and the longitudinal wire $x^1$ (Fig. 12), extending underneath all the transverse wires $y$ and inserted into the groove 10 of the lower plate 9 and pushed up to the stop 21 intersect one another accurately in the path of the reciprocating upper welding pole 11 (Fig. 12 point of intersection $k_1$). An abutment 30 (Figs. 1, 2, 3 and 8) on the table plate against which when commencing work, the carriage bears serves for accurately adjusting.

By lowering the upper welding pole 11 towards the welding plate 9, the welding at the point of intersection $k_1$ is carried out. The carriage II and with the same the mould plate 14 clamped on the same with the transverse wires $y$ inserted, and the first longitudinal wire $x_1$ which has been welded on the transverse wire $y_1$ at the point of intersection $k_1$, are then shifted to the right (Figs. 1 and 12) the required distance to bring the next following point of intersection $k_2$ of the longitudinal wire $x_1$ and the transverse wire $y_2$ between the welding poles 9 and 11. After the point of intersection $k_2$ has been welded the carriage II is shifted in longitudinal direction so that the next following point of intersection $k_3$ gets between the welding poles.

For shifting the carriage by the distance between two successive transverse wires $y$ serves a rack 22 fixed on the lower surface of the carriage-plate 5, (Figs. 1, 2, 3, 7 and 8) in connection with a movable locking pin 23. The pedal lever 48 (Fig. 15) which serves for lowering the upper welding pole 11, controls at the same time the feeding movement of the carriage. A rod 24 (Figs. 3 and 7) upwardly extending from the pedal lever is hingedly connected to the upwardly extending arm 25 of an elbow lever 25, 26 the pivot axle 27 of which is mounted on an angle iron 27 (Figs. 3 and 7) fixed on the table plate I. The other arm of the elbow lever projects through an opening 28 in the table plate I (Fig. 7) and carries above the same in the space between the table plate I and the carriage II a lever 29 (Figs. 3 and 7) and a spring-controlled locking pin 23. By depressing the pedal lever the upper welding pole 11 is lowered towards the welding plate 9 so that the welding is effected. At the same time the lever system described is displaced in the direction of the arrows shown in Fig. 3, so that the locking pin 23 is disengaged from the gap between teeth with which it is in engagement and shifted to the left so that it stands underneath the next following gap between teeth (Fig. 3), in which position it remains as long as the pedal lever is depressed for the welding. When the pedal lever is released, it is returned in the well known manner by the action of a spring or counter-weight into the initial position and makes the lever system oscillate in opposite direction so that the locking pin 23 comes into engagement with the gap between teeth standing above it, and the rack and with the same the carriage is shifted by the distance between two teeth. If the distance corresponds to the distance between two transverse wires $y$ the next following point of intersection with the transverse wire $x$ will be automatically brought between the welding poles so that welding can be carried out.

In the manner described the wire $x_1$ is successively welded onto the wires $y_1$, $y_2$, $y_3$ . . . After the welding of the last point of intersection the carriage must be returned into the starting position with the wires $y$ and then shifted in transverse direction by a distance equal to that between two longitudinal wires $x_1$, $x_2$ for the welding of the next following longitudinal wire $x_2$.

For the return movement of the carriage II into the initial position in which it bears against the stop 30 (Figs. 1, 12 and 8), the locking pin 23 has to be disengaged from the gap between teeth of rack 22. For this purpose a two-armed lever 31, 32 (Figs. 3 and 6) is provided, which is connected by a lever system 33, 34, 35 (Figs. 3, 6 and 1) to a lever 36 (Figs. 1 and 2) mounted at the place where the workman stands. When this lever 36 is moved so that the lever arm 31 depresses the locking pin 23, this locking pin is brought out of engagement with the rack 22, this rack being thus released for the free return movement of the carriage. When the carriage has arrived in the starting position the locking pin 23 is brought again into engagement with the rack 22 by lifting of the lever 36.

The group of wires $y$ with the welded wire $x_1$ has then to be shifted into the position shown in Fig. 13 by the distance between the wire $x_1$ and the next following wire $x_2$ which has to be welded. This shifting is effected in such a manner, that the wire $x_1$ welded onto the wires $y$ is gripped with tongs, lifted out of the groove 10 of the welding plate 9, and pulled forward. This slight upward movement is possible as the $y$ wires have play in the openings 15 of the mould plate 14 in vertical direction, as mentioned above (see for instance Fig. 3). At the lifting of the wire $x_1$ the wire $y_1$ which stands at the extreme right end (Fig. 1) is lifted out of the guide 20 (Figs. 4, 5 and 8) and, when the wire $x'$ is pulled in the transverse direction towards the workman the $y$-wires are pulled out through the apertures of the mould plate. The length of this pull must be regulated so that the next following longitudinal wire $x_2$ is welded upon the $y$-wires accurately at the desired point.

With this object in view several notches are arranged in longitudinal rows on the front carriage-plate 6. A board 37 fixed on the carriage plate 6 (Figs. 1, 9 and 10) carries several transverse flat irons 38, 39 arranged the one at the side of the other and having the foot end embedded in said board, said flat irons 38, 39 having in their upper edge notches $n_1$, $n_2$, $n_3$ . . . or $m_1$, $m_2$, $m_3$ . . . or $o_1$, $o_2$, $o_3$ . . . or $p_1$, $p_2$, $p_3$ . . . which are arranged so that the $n$-notches, the $m$-notches and so on form each one row. The notches are designed to receive the $x$-wires which have been already welded onto the $y$-wires, when the group of $y$-wires is pulled forward by the workman from the mould frame 14. The distance between the row of $m$-notches and the groove 10 of the welding plate 9 corresponds to the distance between the longitudinal wires $x_1$ and $x_2$ of the grating; when, therefore, the group of $y$-wires is pulled forward by the wire $x$ which has been gripped with the tongs, so that the wire $x'$ can be inserted into the row of $m$-notches the next following wire $x_2$ to be inserted into the grooves 10 of the welding plate 9 and to be welded on is in the correct position. According to the shape of the grating to be produced (Fig. 14) the distance between the other rows of notches is selected so that the wire $x_1$ can be inserted into the notches of the $o$-row and the wire $x_2$ into the notches of the $n$-row, if the wire $x_3$ has to be welded on. By conveniently selecting the distance between the rows of notches and the distance of said rows of notches from the welding plate 9, it is possible to secure the groups of wires $y$ on the carriage II in the correct position for the welding on of the next following $x$-wire. When the group of wires $y$ has been pulled forward into the new position and when the $x$-wire which has to be welded on next has been inserted into the groove 10 of the plate, the welding is carried out by depressing the pedal lever and the carriage II is advanced in the above described manner. In this manner the weldings are effected at the points of intersection $l_1$, $l_2$, $l_3$ . . . (Fig. 13).

In order to maintain the $x$-wires inserted into the notches in the correct position, movable riders 40 (Fig. 10) may be arranged on the extreme flat iron 39 so that these riders, after the x-wires have been inserted into the notches, can be turned to grip over said wires, said riders being turned back, when the y-wires have to be pulled forward another distance for releasing the x-wires again.

It is evidently also possible to interchange with one another the movement of the carriage and of the wires, so that the carriage executes a transverse shifting and the x-wires are shifted in the longitudinal direction instead of the y-wires.

The apparatus works very accurately, so that the wire-gratings or bird's cages made on this machine are of much better quality than those manufactured at present. The handling of the new apparatus is so simple, that it can be carried out by any unskilled workman after a very short time of practice. The costs of manufacture for the bird's cage are consequently considerably reduced, as several months have hitherto been necessary for teaching a workman the manufacturing of bird's cages by tying together the wires at the intersection points.

It is further essential, that the y-wires remain permanently in the openings 15 of the mould plate 14 during the moulding so that bending of the y-wires is prevented.

With the aid of the improved apparatus it has become possible for the first time to perfectly weld at all the intersecting points of the wires and at the corners a bird's cage consisting of intersecting wires.

The apparatus works so rapidly that one single apparatus can carry out about 10,000 to 11,000 welding operations in 8 working hours.

For the pedal drive for bringing together the welding plates a mechanical drive may be substituted.

I claim:—

1. Apparatus for electrically welding the points of intersection of the wires for wire gratings, specially for bird's cages comprising in combination, a table plate, a plate forming the lower welding pole fixed in said table plate and serving as carrier for the longitudinal wire actually to be welded on, a carriage on said table plate and carrying the transverse wires, an upper welding pole, means for lowering and lifting said upper welding pole, means for communicating a reciprocating movement in longitudinal direction to said carriage for bringing said transverse wires together between said welding poles, and means for shifting said carriage, with said transverse wires on said carriage and with said longitudinal wire welded on at one point, after each reciprocating movement of said carriage in the transverse direction of a distance equal to the distance between two consecutive transverse wires.

2. Apparatus for electrically welding the points of intersection of the wires for wire gratings, specially for bird's cages comprising in combination, a table plate, a plate forming the lower welding pole fixed in said table plate and serving as carrier for the longitudinal wire actually to be welded on, a carriage on said table plate and carrying the transverse wires, an upper welding pole, means for lowering and lifting said upper welding pole, means for communicating a reciprocating movement in longitudinal direction to said carriage for bringing said transverse wires between said welding poles, means for shifting said carriage, with said transverse wires on said carriage and with said longitudinal wire welded on at one point, after each reciprocating movement of said carriage in the transverse direction of a distance equal to the distance between two consecutive transverse wires, and guides on said carriage for guiding said transverse wires at the transverse shifting.

3. Apparatus for electrically welding the points of intersection of the wires for wire gratings, specially for bird's cages comprising in combination, a table plate, a plate forming the lower welding pole fixed in said table plate and serving as carrier for the longitudinal wire actually to be welded on, a carriage on said table plate and carrying the transverse wires, an upper welding pole, means for lowering and lifting said upper welding pole, means for communicating a reciprocating movement in longitudinal direction to said carriage for bringing said transverse wires between said welding poles, means for shifting said carriage, with said transverse wires on said carriage and with said longitudinal wire welded on at one point, after each reciprocating movement of said carriage in the transverse direction of a distance equal to the distance between two consecutive transverse wires, a plate removably mounted on said carriage, and guides on said plate for guiding said transverse wires at the transverse shifting.

4. Apparatus for electrically welding the points of intersection of the wires for wire gratings, specially for bird's cages comprising in combination, a table plate, a plate forming the lower welding pole fixed in said table plate and having a longitudinal groove in the upper surface for the longitudinal wire actually to be welded on, a carriage on said table plate and carrying the transverse wires, an upper welding pole, means for lowering and lifting said upper welding pole, means for communicating a reciprocating movement in longitudinal direction to said carriage for bringing said transverse wires between said welding poles, means for shifting said carriage, with said transverse wires on said carriage and with said longitudinal wire welded on at one point, after each reciprocating movement of said carriage in the transverse direction of a distance equal to the distance between two consecutive transverse wires.

5. Apparatus for electrically welding the points of intersection of the wires for wire gratings, specially for bird's cages comprising in combination, a table plate, a plate forming the lower welding pole fixed in said table plate and serving as carrier for the longitudinal wire actually to be welded on, a carriage on said table plate and carrying the transverse wires, an upper welding pole, means for lowering and lifting said upper welding pole, means for communicating a reciprocating movement in longitudinal direction to said carriage for bringing said transverse wires between said welding poles, means for shifting said carriage, with said transverse wires on said carriage and with said longitudinal wire welded on at one point, after each reciprocating movement of said carriage in the transverse direction of a distance equal to the distance between two consecutive transverse wires, a board fixed on said carriage, and a number of flat irons standing on edge embedded at the lower edge in said board and having notches in the top edges spaced at a distance equal to the distance between two consecutive longitudinal wires the corresponding notches in said flat irons being in alignment and designed to receive said welded longitudinal wires so that said transverse wires are secured in their position on said carriage at the welding on of the next following longitudinal wire.

6. Apparatus for electrically welding the points of intersection of the wires for wire gratings, specially for bird's cages comprising in combination, a table plate, a plate forming the lower welding pole fixed in said table plate and serving as carrier for the longitudinal wire actually to be welded on, a carriage on said table plate and carrying the transverse wires, an upper welding pole, means for lowering and lifting said upper welding pole, means for communicating a reciprocating movement in longitudinal direction to said carriage for bringing said transverse wires between said welding poles, means for shifting said carriage, with said transverse wires on said carriage and with said longitudinal wire welded on at one point, after each reciprocating movement of said carriage in the transverse direction of a distance equal to the distance between two consecutive transverse wires, said means consisting of a rack fixed on the lower surface of said carriage, of a movable spring-controlled locking pin adapted to engage with a gap between teeth of said rack, and of a lever mechanism for disengaging said locking pin from a gap between teeth and for bringing it into engagement with the next following gap between teeth when said carriage has been advanced.

7. Apparatus for electrically welding the points of intersection of the wires for wire gratings, specially for bird's cages comprising in combination, a table plate, a plate forming the lower welding pole fixed in said table plate and serving as carrier for the longitudinal wire actually to be welded on, a carriage on said table plate and carrying the transverse wires, an upper welding pole, means for lowering and lifting said upper welding pole, means for communicating a reciprocating movement in longitudinal direction to said carriage for bringing said transverse wires between said welding poles, means for shifting said carriage, with said transverse wires on said carriage and with said longitudinal wire welded on at one point, after each reciprocating movement of said carriage in the transverse direction of a distance equal to the distance between two consecutive transverse wires, said means consisting of a rack fixed on the lower surface of said carriage, of a movable spring controlled locking pin adapted to engage with a gap between teeth of said rack, of a lever mechanism for disengaging said locking pin from a gap between teeth and for bringing it into engagement with the next following gap between teeth when said carriage has been advanced, and means connecting said means for lowering and lifting said upper welding pole with said means for shifting said carriage so that the shifting movement is prepared during the lowering of said upper welding pole and carried out at the lifting of the same.

In testimony whereof I affix my signature.

VICTOR DOBRICK.